United States Patent
Takeuchi et al.

(10) Patent No.: US 10,643,768 B2
(45) Date of Patent: May 5, 2020

(54) THERMISTOR SINTERED BODY AND THERMISTOR ELEMENT

(71) Applicant: SHIBAURA ELECTRONICS CO., LTD., Saitama-shi, Saitama (JP)

(72) Inventors: Akitaka Takeuchi, Saitama (JP); Naohiro Niizeki, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 16/475,944

(22) PCT Filed: Apr. 27, 2018

(86) PCT No.: PCT/JP2018/017149
§ 371 (c)(1),
(2) Date: Jul. 3, 2019

(87) PCT Pub. No.: WO2018/235432
PCT Pub. Date: Dec. 27, 2018

(65) Prior Publication Data
US 2019/0348201 A1    Nov. 14, 2019

(30) Foreign Application Priority Data
Jun. 20, 2017    (JP) .................................. 2017-120348

(51) Int. Cl.
*H01C 7/04*    (2006.01)
*C04B 35/505*    (2006.01)
*C04B 35/64*    (2006.01)

(52) U.S. Cl.
CPC .......... *H01C 7/043* (2013.01); *C04B 35/505* (2013.01); *C04B 35/64* (2013.01);
(Continued)

(58) Field of Classification Search
CPC .......... H01C 7/043; H01C 7/008; H01C 7/02; C04B 35/505; C04B 35/64; C04B 2235/3225
See application file for complete search history.

(56) References Cited

U.S. PATENT DOCUMENTS 3,975,307 A * 8/1976 Matsuo .................... H01B 1/08
                                                           252/520.21
5,749,656 A * 5/1998 Boehm .................... G01K 7/22
                                                           338/28
(Continued)

FOREIGN PATENT DOCUMENTS

JP    H08-198674 A    8/1986
JP    H10-70011 A    3/1998
(Continued)

OTHER PUBLICATIONS

JP 2010-225903, Ueda et al., machine translation of the description. (Year: 2010).*
(Continued)

*Primary Examiner* — Kyung S Lee
(74) *Attorney, Agent, or Firm* — Pearne & Gordon LLP

(57) ABSTRACT

A thermistor sintered body that can control a B constant at 1000° C. to the same level as that of a conventional wide range type. The thermistor sintered body according to the present invention has a composite structure that includes a $Y_2O_3$ phase and a $Y(Cr, Mn)O_3$ phase or a $YMnO_3$ phase. In the thermistor sintered body according to one aspect of the present invention, a chemical composition of Cr, Mn, Ca and Y excluding oxygen is Cr: 3 to 9 mol %, Mn: 5 to 15 mol %, Ca: 1 to 8 mol % (where Cr/Mn<1.0), and the balance being unavoidable impurities and Y. In the thermistor sintered body, the B constant (B(0/1000)) determined by the following Expression (1) is 2400 K or lower; B=(lnRm−
(Continued)

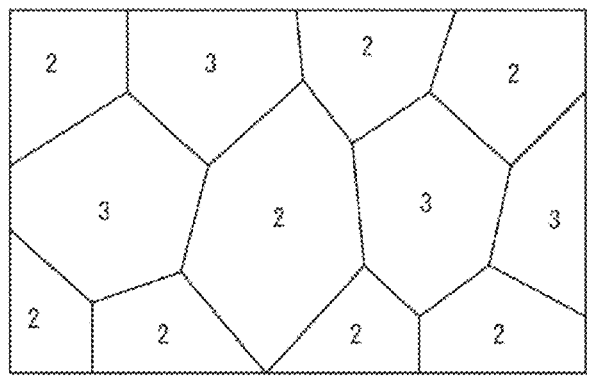

$Y_2O_3$ phase: 2
$Y(Cr, Mn)O_3$ phase: 3 lnRn)/(1/Tm−1/Tn) . . . (1). Rm: resistance value at 0° C., Rn: resistance value at 1000° C., Tm: 0° C., and Tn: 1000° C.

20 Claims, 13 Drawing Sheets

(52) U.S. Cl.
CPC ............ *C04B 2235/3225* (2013.01); *C04B 2235/3241* (2013.01); *C04B 2235/3263* (2013.01); *C04B 2235/442* (2013.01); *C04B 2235/5436* (2013.01); *C04B 2235/6567* (2013.01); *C04B 2235/661* (2013.01)

(56) References Cited

U.S. PATENT DOCUMENTS

| | | | |
|---|---|---|---|
| 9,790,098 B2* | 10/2017 | Watanabe | C01G 37/006 |
| 2009/0016409 A1* | 1/2009 | Mizoguchi | C01G 45/125 |
| | | | 374/185 |
| 2011/0027587 A1* | 2/2011 | Poulain | H01Q 7/043 |
| | | | 428/402 |
| 2013/0308683 A1* | 11/2013 | Ko | H01Q 7/06 |
| | | | 374/185 |
| 2017/0301437 A1* | 10/2017 | Yamaguchi | H01Q 1/14 |

FOREIGN PATENT DOCUMENTS

| | | |
|---|---|---|
| JP | 2005294653 A | 10/2005 |
| JP | 2006108221 A | 4/2006 |
| JP | 2010025603 A | 2/2010 |
| JP | 2010225903 A | 10/2010 |
| JP | 2013234105 A | 11/2013 |

OTHER PUBLICATIONS

International Search Report for PCT/JP2018/017149 dated Jun. 26, 2018.
Written Opinion for PCT/JP2018/017149 dated Jun. 26, 2018.

* cited by examiner

Y$_2$O$_3$ phase: 2

Y(Cr, Mn)O$_3$ phase: 3

FIG. 1C

[Mol%]

|  | Y | Cr | Mn | Ca | O |
|---|---|---|---|---|---|
| Y(Cr,Mn)O₃ | 16.90 | 9.21 | 9.17 | 3.01 | 67.71 |
| Y₂O₃ | 37.67 | 0 | 0 | 0.07 | 62.26 |

FIG. 3

| Sample No. | Chemical composition [mol.%] | | | | | B constant [K] |
|---|---|---|---|---|---|---|
| | Y | Cr | Mn | Ca | Cr/Mn | B25/50 |
| 1 | 79.5 | 5.5 | 11.5 | 3.5 | 0.478 | 2195 |
| 2 | 79.4 | 6.75 | 10.35 | 3.5 | 0.652 | 2191 |
| 3 | 80.5 | 6.5 | 9.5 | 3.5 | 0.684 | 2137 |
| 4 | 80 | 7 | 9.5 | 3.5 | 0.737 | 2207 |
| 5 | 79.75 | 7.25 | 9.5 | 3.5 | 0.763 | 2227 |
| 6 | 80.5 | 7 | 9 | 3.5 | 0.778 | 2155 |
| 7 | 77 | 6 | 13 | 4 | 0.462 | 2157 |
| 8 | 77 | 7.5 | 11.5 | 4 | 0.652 | 2162 |
| 9 | 78.5 | 7.5 | 10 | 4 | 0.750 | 2111 |
| 10 | 81 | 6.5 | 8.5 | 4 | 0.765 | 2084 |
| 11 | 80.5 | 7 | 8.5 | 4 | 0.824 | 2122 |
| 12 | 80 | 7.5 | 8.5 | 4 | 0.882 | 2143 |
| 13 | 80 | 6 | 10 | 4 | 0.600 | 2034 |
| 14 | 79.5 | 6.5 | 10 | 4 | 0.650 | 2053 |
| 15 | 79 | 7 | 10 | 4 | 0.700 | 2079 |
| 17 | 79 | 7.5 | 10 | 3.5 | 0.750 | 2195 |
| 18 | 80 | 6.5 | 9.5 | 4 | 0.684 | 2051 |
| 19 | 79.5 | 6.5 | 9.5 | 4.5 | 0.684 | 2042 |
| 20 | 79 | 6.5 | 9.5 | 5 | 0.684 | 2066 |
| 21 | 80 | 7 | 8.5 | 4.5 | 0.824 | 2108 |
| 22 | 79.5 | 7 | 8.5 | 5 | 0.824 | 2224 |
| 23 | 80 | 6.5 | 9.5 | 4 | 0.684 | 2073 |
| 24 | 80.5 | 6.5 | 8.5 | 4.5 | 0.765 | 2085 |
| 25 | 82 | 5.5 | 8.5 | 4 | 0.647 | 2055 |
| 26 | 81.75 | 5.75 | 8.5 | 4 | 0.676 | 2025 |
| 27 | 81.5 | 6 | 8.5 | 4 | 0.706 | 2033 |
| 28 | 81.25 | 6.25 | 8.5 | 4 | 0.735 | 2058 |
| 29 | 80.75 | 6.75 | 8.5 | 4 | 0.794 | 2068 |
| 30 | 80.5 | 6.5 | 9 | 4 | 0.722 | 2056 |
| 31 | 80.75 | 6.5 | 8.75 | 4 | 0.743 | 2063 |
| 32 | 81.25 | 6.5 | 8.25 | 4 | 0.788 | 2067 |
| 33 | 81.5 | 6.5 | 8 | 4 | 0.813 | 2067 |
| 34 | 81.75 | 6.5 | 7.75 | 4 | 0.839 | 2076 |
| 35 | 82 | 6.5 | 7.5 | 4 | 0.867 | 2101 |
| 36* | 79.5 | 8.5 | 8.5 | 3.5 | 1.000 | 2240 |
| 37* | 80 | 10 | 6.5 | 3.5 | 1.538 | 2535 |

*Comparative Example

FIG. 4

|  | B constant [K] | | | | Resistance value [KΩ] at 1050 °C | Resistance value 100KΩ Exhibiting temperature [°C] |
| --- | --- | --- | --- | --- | --- | --- |
|  | B(−40/1000) | B(0/1000) | B(−40/25) | B(25/600) | B(600/1000) | | |
| 3 | 2254 | 2286 | 2119 | 2263 | 2550 | 0.0525 | −30 |
| 8 | 2243 | 2270 | 2133 | 2264 | 2398 | 0.0560 | −30 |
| 10 | 2180 | 2228 | 1984 | 2180 | 2695 | 0.1080 | −10 |
| 11 | 2278 | 2326 | 2081 | 2285 | 2752 | 0.0504 | −30 |
| 13 | 2149 | 2185 | 2007 | 2177 | 2348 | 0.0517 | −40 |
| 19 | 2192 | 2236 | 2014 | 2211 | 2536 | 0.0533 | −35 |
| 36* | 2389 | 2442 | 2175 | 2388 | 2952 | 0.0308 | −30 |
| 37* | 2842 | 2922 | 2484 | 2822 | 3899 | 0.0476 | +25 |

FIG. 9

| Sample No. | Chemical composition [mol.%] | | | | | B constant [K] |
|---|---|---|---|---|---|---|
| | Y | Cr | Mn | Ca | Cr/Mn | B25/50 |
| 38 | 72 | 4 | 16 | 8 | 0.25 | 1845 |
| 39 | 71 | 4 | 16 | 9 | 0.25 | 1976 |
| 40 | 68 | 4 | 16 | 12 | 0.25 | 2002 |
| 41 | 64 | 4 | 16 | 16 | 0.25 | 2028 |
| 42 | 76 | 0 | 16 | 8 | 0 | 2012 |
| 43 | 72 | 0 | 16 | 12 | 0 | 2069 |
| 44 | 68 | 0 | 16 | 16 | 0 | 2029 |
| 36* | 79.5 | 8.5 | 8.5 | 3.5 | 1.000 | 2240 |
| 37* | 80 | 10 | 6.5 | 3.5 | 1.538 | 2535 |

*Comparative Example

※ Peak of hexagonal crystal system
☆ Peak of orthorhombic crystal system

THERMISTOR SINTERED BODY AND THERMISTOR ELEMENT

This is the National Stage of PCT international application PCT/JP2018/017149 filed on Apr. 27, 2018, which claims priority from Japanese Patent Application No. 2017-120348 filed on Jun. 20, 2017, the content of each of which is incorporated herein by reference in its entirety.

TECHNICAL FIELD

The present invention relates to a thermistor sintered body and a thermistor element which can accurately detect a temperature in a wide temperature range.

BACKGROUND ART

Conventionally, a temperature sensor has been widely used that uses a thermistor of which the electric resistance value (hereinafter simply referred to as a resistance value) changes according to a temperature, as a heat sensitive body. The characteristics of the thermistor are generally shown by the resistance value and a temperature coefficient of resistance (temperature dependence of the resistance value). The resistance value characteristics of the thermistor are different depending on a material constituting the element, and various materials have been developed which show the resistance value characteristics according to the purpose of use.

An average temperature coefficient of resistance (hereinafter referred to as B constant) can be obtained by the following expression;

$$B = (\ln Rm - \ln Rn)/(1/Tm - 1/Tn)$$

Rm: Resistance value at temperature Tm
Rn: Resistance value at temperature Tn

The thermistor is a substance which detects a temperature based on a change in the resistance value, and when the resistance value becomes too low, cannot accurately detect the temperature. Accordingly, a thermistor which is used in a wide temperature range is required to have a small B constant.

As is disclosed in Patent Literature 1 and Patent Literature 2, a thermistor is known which has an NTC (Negative Temperature Coefficient: negative temperature coefficient of resistance) characteristics having a B constant of 2500 K or lower in a temperature range of 25° C. to 700° C. It is disclosed that the thermistors in Patent Literature 1 and Patent Literature 2 are formed of an oxide sintered body of which the composition is Y, Cr, Mn and Ca, and that a typical composition of Y, Cr, Mn and Ca is Y: 79.5 mol %, Cr: 8.5 mol %, Mn: 8.5 mol % and Ca: 3.5 mol %.

According to Patent Literature 1, this thermistor sintered body has resistance values of 28.801 kΩ, 6.291 kΩ, 0.6862 kΩ, 0.2196 kΩ and 0.1041 kΩ at 25° C., 100° C., 300° C., 500° C. and 700° C., respectively; and has the B constant of 2417 K in a temperature range between 25° C. and 700° C. It is disclosed that this thermistor can be used for controlling a temperature to 700° C. or lower.

Patent Literature 2 uses a thermistor chip formed of an oxide sintered body having the same composition as that of Patent Literature 1, and achieves a mechanically, thermally and chemically stable thermistor element over a wide temperature range from −50° C. to approximately 1000° C. However, Patent Literature 2 achieves the stable thermistor element in the above described wide temperature range, by covering a joined portion between the thermistor chip and a lead wire, with a covering material that is formed of the metal oxide and a sintering accelerator which does not have a conductivity enhancing function. In other words, a different point between Patent Literature 2 and Patent Literature 1 exists in a material of the covering material, and the B constant of the oxide sintered body which is disclosed by Patent Literature 2 and has the same composition as that of Patent Literature 1 is equivalent to that of Patent Literature 1.

CITATION LIST

Patent Literature

Patent Literature 1: JP 2005-294653 A
Patent Literature 2: JP 2006-108221 A

SUMMARY OF INVENTION

Technical Problem

It is required for thermistors to be used in a higher temperature range, and in the circumstance, it is required to control the B constant of the thermistor itself so that the B constant can cope with this high temperature range.

For this reason, an object of the present invention is to provide a thermistor sintered body which can control the B constant to the same extent as that of the conventional wide range type even at 1000° C., and to provide a thermistor element.

Solution to Problem

The thermistor sintered body of the present invention is formed of a sintered body that includes a $Y_2O_3$ phase and a $Y(Cr, Mn)O_3$ phase or a $YMnO_3$ phase, and is rich in Mn relative to Cr.

The thermistor sintered body of the present invention is characterized in that the B constant (B (0/1000)) determined by the following Expression (1) is 2400 K or lower;

$$B = (\ln Rm - \ln Rn)/(1/Tm - 1/Tn) \tag{1}$$

Rm: Resistance value at 0° C.
Rn: Resistance value at 1000° C.
Tm: 0° C.
Tn: 1000° C.

The thermistor sintered body of the present invention includes a form A of which the structure includes the $Y_2O_3$ phase and the $Y(Cr, Mn)O_3$ phase, and a form B of which the structure includes the $Y_2O_3$ phase and the $YMnO_3$ phase.

The form A can be further divided into a form A1 in which Cr/Mn is relatively large, and a form A2 in which Cr/Mn is relatively small. A difference between the form A1 and the form A2 is that a Cr content of the latter is small but a content of Ca is large and Cr/Mn is small, as compared with those of the former.

The form B does not contain Cr, but contains a large amount of Ca.

A preferable chemical composition of Cr, Mn, Ca and Y excluding oxygen in the sintered body according to the form A1 is Cr: 3 to 9 mol %, Mn: 5 to 15 mol %, and Ca: 1 to 8 mol % (where Cr/Mn<1.0). In this thermistor sintered body, it is preferable for Cr/Mn to be 0.2 to 0.9, is more preferable to be 0.6 to 0.9, and is further preferable to be 0.7 to 0.8.

A preferable chemical composition of Cr, Mn, Ca and Y excluding oxygen in the sintered body according to the form A2 is Cr: ≤5 mol % (where, excluding 0), Mn: 12 to 18 mol %, Ca: 6 to 18 mol %, and the balance being unavoidable impurities and Y. In this thermistor sintered body, it is preferable for Cr/Mn to be 0.5 or smaller, is more preferable to be 0.4 or smaller, and is further preferable to be 0.3 or smaller.

A preferable chemical composition of Mn, Ca and Y excluding oxygen in the sintered body in the form B is Mn: 12 to 18 mol %, Ca: 6 to 18 mol %, and the balance being unavoidable impurities and Y. The Cr/Mn in this thermistor sintered body is zero.

In addition, in the thermistor sintered body of the present invention, it is preferable that Ca dissolves in the Y(Cr, Mn)$O_3$ phase or dissolves in the YMn$O_3$ phase. Incidentally, as will be described later, Ca dissolves in the $Y_2O_3$ phase as well.

The thermistor sintered body of the present invention is preferably formed of a crystal structure of an orthorhombic crystal system.

The thermistor sintered body of the present invention can control the B constant to be low, in each of temperature ranges of a low temperature range (−40° C. to 25° C.), a middle temperature range (25° C. to 600° C.) and a high temperature range (600° C. to 1000° C.)

Specifically, in the thermistor sintered body of the present invention, a B constant (B(−40/25)) can be set at 2200 K or lower, a B constant (B(25/600)) can be set at 2300 K or lower, and a B constant (B(600/1000)) can be set at 2800 K or lower.

Each of the B constants is calculated by the above described Expression (1).

The thermistor sintered body of the present invention can exhibit 0.05 kΩ or larger as the resistance value at 1050° C., and exhibits 100 kΩ as the resistance value at room temperature or lower.

The present invention provides a thermistor element by using the above described thermistor sintered body. This thermistor element includes a heat sensitive body, a pair of lead wires electrically connected to the heat sensitive body, and a covering layer covering the heat sensitive body; and the thermistor sintered body described above can be applied to the heat sensitive body.

Advantageous Effects of Invention

According to the present invention, it is possible to control the B constant (B(0/1000)) to 2400 K or lower, in the thermistor sintered body formed of a composite structure which includes the $Y_2O_3$ phase and the Y(Cr, Mn)$O_3$ phase or the YMn$O_3$ phase, by controlling the composition so that 0≤Cr/Mn<1.0 holds, in other words Mn is relatively rich to Cr. Thereby, the present invention can provide a thermistor sintered body that can accurately detect a temperature in a wide temperature range from −50 to 1200° C.

BRIEF DESCRIPTION OF DRAWINGS

FIG. 1A, FIG. 1B and FIG. 1C show a structure of a thermistor sintered body according to an embodiment of the present invention, FIG. 1A being a view schematically showing the structure, FIG. 1B being a microstructure photograph of the thermistor sintered body according to the present embodiment, and FIG. 1C being a table showing analysis results of chemical compositions of a $Y_2O_3$ phase and a Y(Cr, Mn)$O_3$ phase.

FIG. 3 is a table showing chemical compositions and characteristics (B(25/50)) of Example 1 and Comparative Example.

FIG. 4 is a table showing chemical compositions and characteristics (B constant, resistance value (1050° C.), and temperature exhibiting a resistance value of 100 kΩ) of Example 1 and Comparative Example.

FIG. 9 is a table showing chemical compositions and characteristics (B(25/50)) of Example 2.

DESCRIPTION OF EMBODIMENTS

Embodiments of the present invention will be described below with reference to the attached drawings.

Figure 1A:
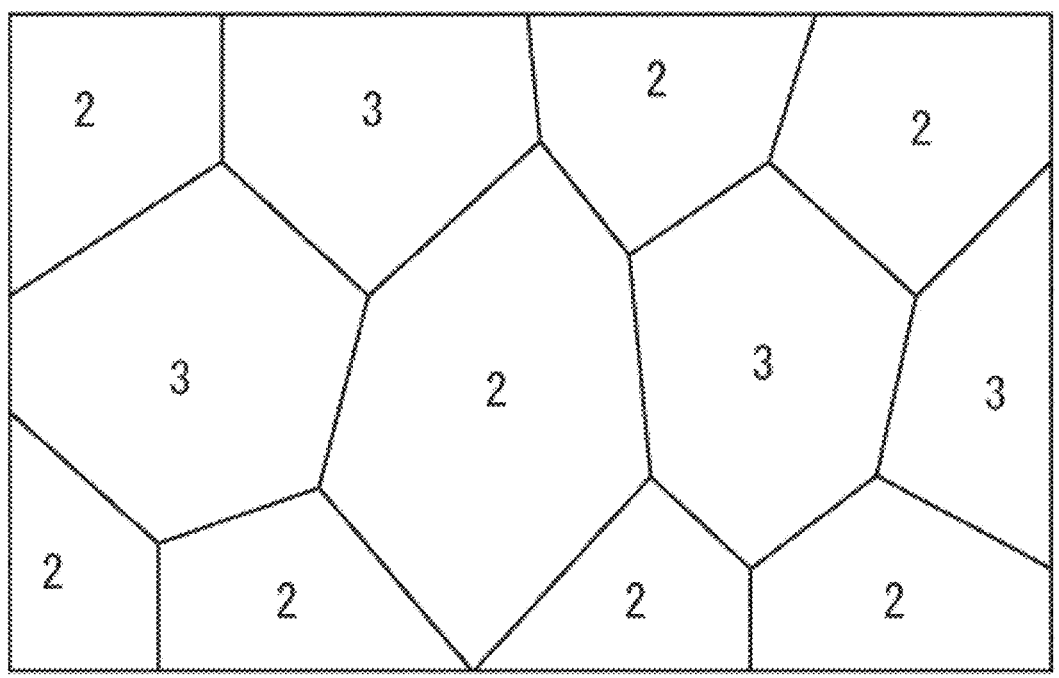

As is shown in FIG. 1A, a thermistor sintered body according to the present embodiment is an oxide sintered body having a composite structure including the $Y_2O_3$ phase (2) and the Y(Cr, Mn)$O_3$ phase (3). This thermistor sintered body corresponds to the previously described form A1 and form A2.

The $Y_2O_3$ phase has properties of an electrical insulator, and affects a resistance value of the thermistor sintered body. In addition, the Y(Cr, Mn)$O_3$ phase has a property of a semiconductor, and affects a B constant of the thermistor sintered body.

The thermistor sintered body has a structure of a sintered body, which has the $Y_2O_3$ phase of which the resistance value and the B constant are high, and the Y(Cr, Mn)$O_3$ phase of which the resistance value and the B constant are low. The thermistor sintered body is more occupied by the $Y_2O_3$ phase than by the Y(Cr, Mn)$O_3$ phase, and more than 50% by volume to 90% by volume is occupied by the $Y_2O_3$ phase, and the remaining portion (10% by volume or more, and less than 50% by volume) is occupied by the Y(Cr, Mn)$O_3$ phase.

Figure 1B:
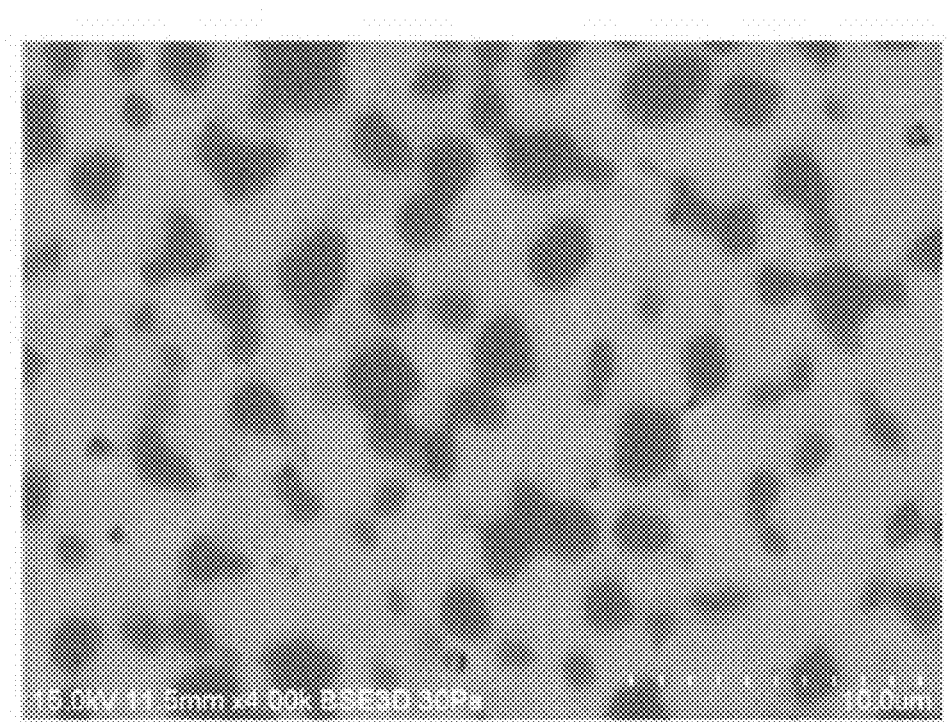

As one example, a microstructure photograph (4000 magnitudes) of the thermistor sintered body is shown in FIG. 1B. The thermistor sintered body typically has a sea-island structure, and has a composite structure in which the Y(Cr, Mn)$O_3$ phase that forms a sub-phase is dispersed in the $Y_2O_3$ phase that forms a main phase. The thermistor sintered body preferably contains 60 to 90% by volume of the $Y_2O_3$ phase, and more preferably 65 to 75% by volume.

When the thermistor sintered body has the sea-island structure, grain boundaries cannot be clearly identified in some cases, but the $Y_2O_3$ phase has an average grain size (d50) of approximately 0.5 to 30 μm and the $Y(Cr, Mn)O_3$ phase has an average grain size of approximately 1.0 to 10 μm.

Each of the $Y_2O_3$ phase and the $Y(Cr, Mn)O_3$ phase in the thermistor sintered body has been subjected to a composition analysis.

The results are shown in FIG. 1C, and it has been confirmed that Ca dissolves in the $Y(Cr, Mn)O_3$ phase. Ca dissolves in the $Y(Cr, Mn)O_3$ phase, which is considered to thereby contribute to lowering the B constant of the $Y(Cr, Mn)O_3$ phase.

In the case of a composition system which does not contain Cr, as in the form B, the $YMnO_3$ phase is formed instead of the $Y(Cr, Mn)O_3$ phase, and Ca dissolves in the $YMnO_3$ phase.

The thermistor sintered body exhibits thermistor characteristics of NTC, and has the following characteristic: the B constant (B(0/1000)) in a temperature range between 0° C. and 1000° C. is 2400 K or lower. Thus, according to the thermistor sintered body, the B constant can be lowered in a wide temperature range. Besides, the thermistor sintered body according to the present invention can control a resistance value at 1050° C. to 0.05 kΩ or larger, and preferably to 0.1 kΩ or larger; and also can exhibit a resistance value of 100 kΩ at room temperature or lower, and preferably below the freezing point, for example, at −40° C. or lower. Thereby, by using the thermistor sintered body, it becomes possible to accurately detect a temperature in a wide temperature range ranging from a temperature below the freezing point to 1000° C., more specifically, −50 to 1200° C.

The thermistor sintered body which has the $Y_2O_3$ phase and the $Y(Cr, Mn)O_3$ phase and corresponds to the form A1 has a chemical composition of Cr, Mn, Ca and Y excluding oxygen, which contains Cr: 3 to 9 mol %, Mn: 5 to 15 mol %, Ca: 1 to 8 mol %, and the balance being unavoidable impurities and Y.

In addition, the thermistor sintered body which includes the $Y_2O_3$ phase and the $Y(Cr, Mn)O_3$ phase and corresponds to the form A2 has a chemical composition of Cr, Mn, Ca and Y excluding oxygen, which contains Cr: 5 mol % (excluding 0), Mn: 12 to 18 mol %, Ca: 6 to 18 mol %, and the balance being unavoidable impurities and Y.

In addition to adopting the above described composition range, the thermistor sintered body has a composition in which Cr/Mn that is a ratio of Cr to Mn is smaller than 1, in other words, Mn is relatively rich to Cr. The thermistor sintered body can lower the B constant by adopting this Mn-rich composition. Because of this, in the thermistor sintered body, in the form A1, the range of Cr is set at 3 to 9 mol %, but on the other hand, the range of Mn is set at 5 to 15 mol %.

A preferable range of Cr is 5 to 9 mol %, and a more preferable range of Cr is 6 to 8 mol %.

In addition, a preferable range of Mn is 7 to 12 mol %, and a more preferable range of Mn is 8 to 11 mol %.

It is preferable for the Cr/Mn to be 0.4 to 0.9, is more preferable to be 0.6 to 0.9, and is further preferable to be 0.7 to 0.8.

Also in the form A2, the Mn-rich composition is adopted; but a range of Cr is ≤5 mol % (excluding 0), and on the other hand, a range of Mn is set at 12 to 23 mol %.

A preferable range of Cr is 1 to 5 mol %, and a more preferable range of Cr is 2 to 4 mol %.

In addition, a preferable range of Mn is 12 to 20 mol %, and a more preferable range of Mn is 14 to 18 mol %.

It is preferable for Cr/Mn to be 0.4 or smaller, and is more preferable to be 0.3 or smaller.

The form B which adopts the most Mn-rich composition does not contain Cr, and sets a range of Mn at 12 to 18 mol %. The preferable range of Mn is similar to that in the form A2.

Ca has a function of lowering the B constant of the thermistor sintered body by dissolving in the $Y(Cr, Mn)O_3$ phase. Accordingly, when the amount of Ca is increased, the B constant can be lowered even though the Cr/Mn has been increased.

In the form A1, a preferable range of Ca is 2 to 7 mol %, and a more preferable range of Ca is 3 to 5 mol %.

The form A2 and the form B contain 6 to 18 mol % of Ca, which is more as compared with that of the form A1; and a preferable range of Ca is 6 to 14 mol %, and a more preferable range of Ca is 6 to 10 mol %.

[Method for Producing Thermistor Sintered Body]

Next, one example of a method for producing a thermistor sintered body will be described with reference to FIG. 2.

Figure 2:
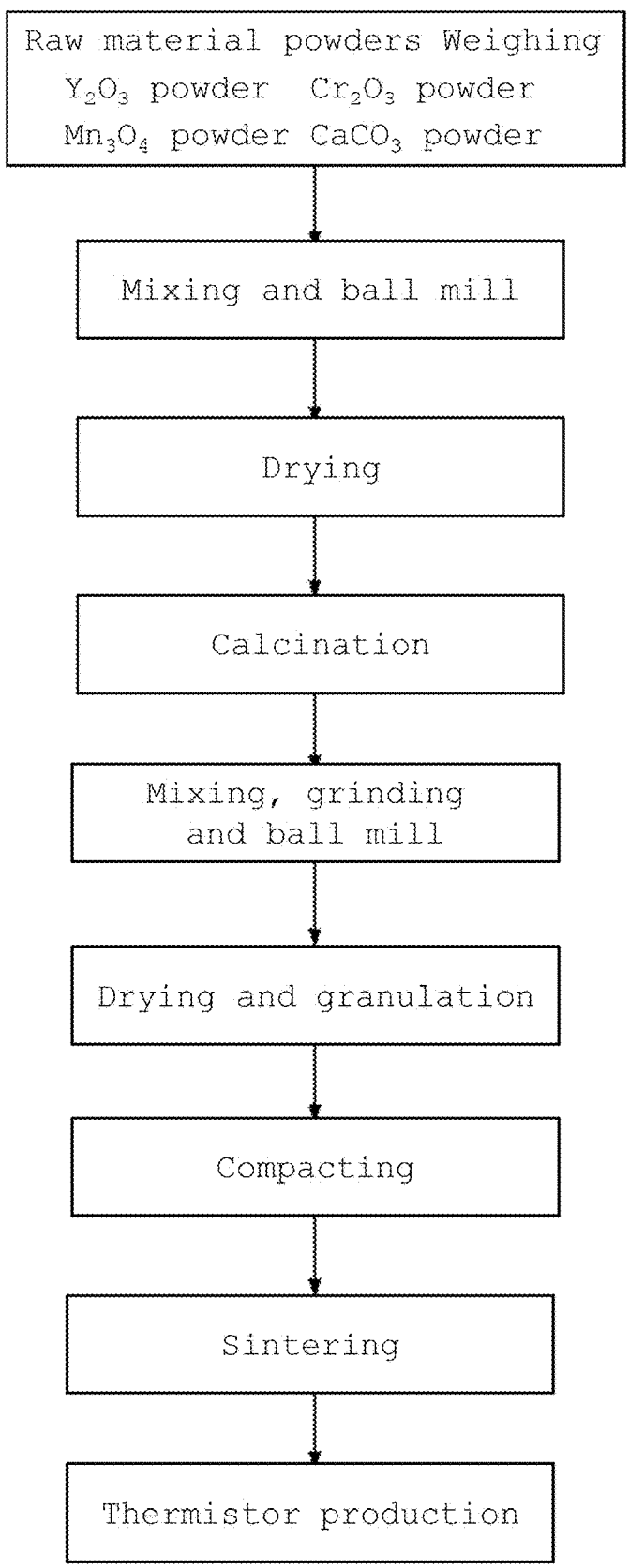
FIG. 2 is a flow chart showing one example of a production procedure of a thermistor sintered body according to the present embodiment.

As is shown in FIG. 2, the production method according to the present embodiment includes steps of weighing of raw material powders, mixing of the raw material powders, drying of the raw material powders, calcining, mixing/grinding after calcining, drying/granulating, compacting and sintering. Each of the steps will be described below in sequence.

[Weighing of Raw Material Powders]

In the present embodiment, yttrium oxide ($Y_2O_3$) powder, chromium oxide ($Cr_2O_3$) powder, manganese oxide (MnO, $Mn_2O_3$, $Mn_3O_4$ or the like) powder and $CaCO_3$ powder are used as raw material powders. When a thermistor sintered body according to the form B is produced, the chromium oxide ($Cr_2O_3$) powder is removed.

The above described raw material powders are weighed so as to form the above described chemical composition.

The $Y_2O_3$ powder contributes to the formation of a $Y_2O_3$ phase, and the $Y_2O_3$ powder, the $Cr_2O_3$ powder and the $Mn_3O_4$ powder contribute to the formation of a $Y(Cr, Mn)O_3$ phase. The $CaCO_3$ powder functions as a sintering aid; and in addition, dissolves in the $Y(Cr, Mn)O_3$ phase in a form of Ca, and contributes to lowering a B constant.

As for the raw material powders, powders are used of which the purities are 98% or higher, preferably 99% or higher, and more preferably 99.9% or higher, in order to obtain a thermistor sintered body having high characteristics.

In addition, the particle size of the raw material powder is not limited as long as calcination proceeds, but can be selected from a range of 0.1 to 6.0 μm by an average particle size (d50).

[Mixing of Raw Material Powders and Ball Mill]

The $Y_2O_3$ powder, the $Cr_2O_3$ powder, the $Mn_3O_4$ powder and the $CaCO_3$ powder which have been weighed by predetermined amounts are mixed. The mixing can be performed, for example, by using a ball mill to mix the mixed powders converted into a slurry by addition of water. A mixer other than the ball mill can also be used for the mixing.

[Drying of Raw Material Powders]

It is preferable to dry and granulate the slurry which has been mixed, by a spray dryer or other equipment, and to form a mixed powder for calcination.

[Calcination]

The mixed powder for calcination, which has been dried, is calcined. By the calcination, a calcined body having a composite structure of the $Y_2O_3$ phase and the $Y(Cr, Mn)O_3$ phase is obtained from the $Y_2O_3$ powder, the $Cr_2O_3$ powder, the $Mn_3O_4$ powder and the $CaCO_3$ powder.

The calcination is performed by placing the mixed powder for calcination, for example, in a crucible, and holding the mixed powder in a temperature range of 800 to 1300° C. in the air. If the calcination temperature is lower than 800° C., the formation of the composite structure is insufficient, and if the calcination temperature exceeds 1300° C., there is a possibility that a sintering density lowers and/or the stability of the resistance value lowers. Therefore, the holding temperature in the calcination is set in the range of 800 to 1300° C.

A holding time period in the calcination should be appropriately set according to the holding temperature, but if the holding temperature is in the above described temperature range, the purpose of the calcination can be achieved by the holding time period of approximately 0.5 to 100 hours.

[Mixing, Pulverization and Ball Mill]

The calcined powder is mixed and pulverized. The powders can be converted into slurry by addition of water, and be mixed and pulverized with the use of a ball mill, in the same manner as before the calcination.

[Drying and Granulation]

It is preferable to dry and granulate the pulverized powder, by a spray dryer or other equipment.

[Compacting]

The granulated powder after the calcination is compacted into a predetermined shape.

For compacting, press compacting with the use of a die, and besides a cold isostatic press (CIP) can be used.

The higher the density of the compacted body is, the higher density a sintered body easily obtains; and accordingly, it is desirable to enhance the density of the compacted body as highly as possible. For that purpose, it is preferable to use the CIP which can obtain the high density.

[Sintering]

Next, the obtained compacted body is sintered.

The sintering is performed by a procedure of holding the temperature range of 1400 to 1650° C. in the air. If the sintering temperature is lower than 1400° C., the formation of the composite structure is insufficient; and if it exceeds 1650° C., the sintered body melts, and/or a reaction occurs with a sintering crucible and/or the like. The holding time period in the sintering should be appropriately set according to the holding temperature, but if the holding temperature is in the above described temperature range, a dense sintered body can be obtained by a holding time period of approximately 0.5 to 200 hours.

It is preferable to subject the obtained thermistor sintered body to annealing, in order to stabilize the thermistor characteristics. The thermistor sintered body is annealed by being held, for example, at 1000° C. in the air.

[Thermistor Element]

A specific example of a thermistor 10 will be described to which the thermistor sintered body obtained in the above described way is applied.

Figure 7A:
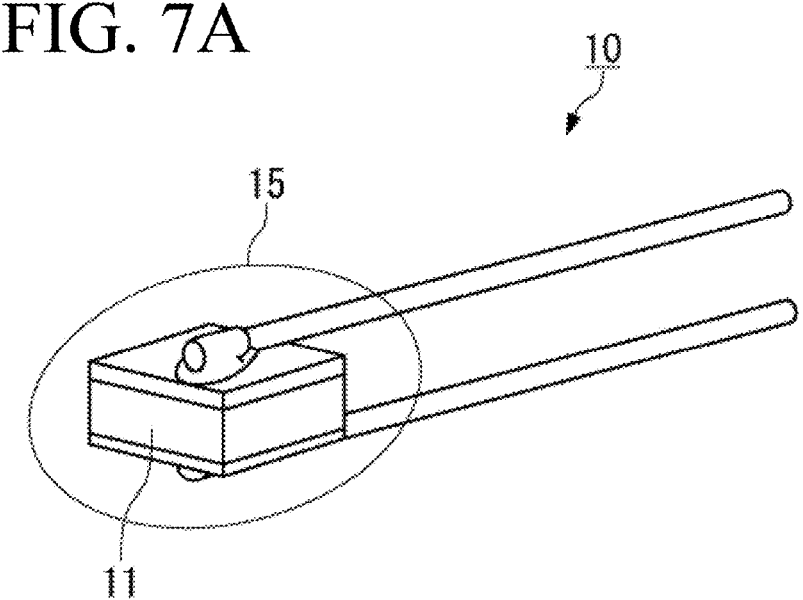
FIG. 7A and FIG. 7B are each a perspective view showing one example of a thermistor element that uses the thermistor sintered body according to the present embodiment.

As is shown in FIG. 7A, the thermistor 10 includes a thermistor element 11 and a covering layer 15.

The thermistor element 11 is used together with a detection circuit for extracting a change of a resistance value as a change of voltage, thereby detects a temperature of an environment in which the thermistor element 11 is placed, and generates a temperature detection signal consisting of an electrical signal.

The covering layer 15 seals the thermistor element 11 to keep the thermistor element 11 in an airtight state, thereby prevents the occurrence of chemical and physical changes of the thermistor sintered body in particular, based on the environmental conditions, and also mechanically protects the thermistor element 11.

Figure 7B:
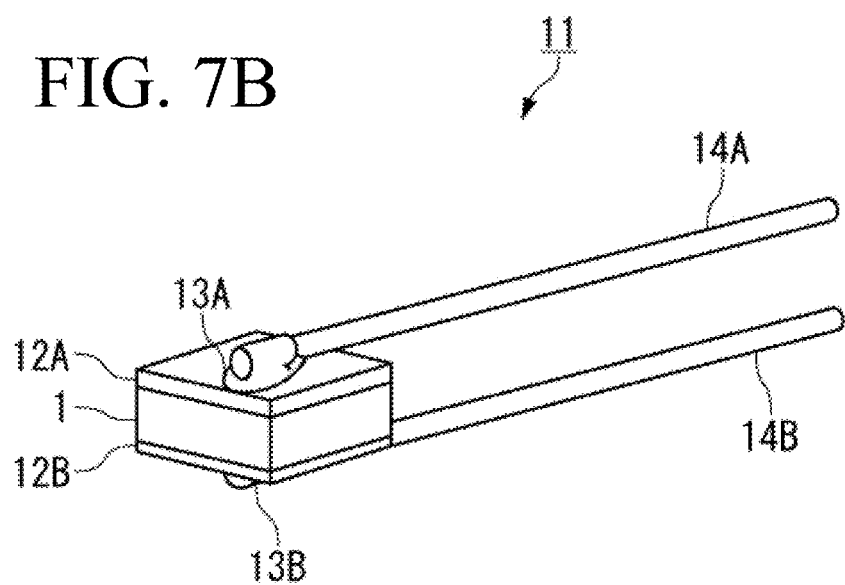

As is shown in FIG. 7B, the thermistor element 11 in this example includes a flat plate-like thermistor sintered body, electrodes 12A and 12B, connection electrodes 13A and 13B, and lead wires 14A and 14B.

The electrodes 12A and 12B are each formed in a film shape on the whole area of both the front and rear surfaces of the plate-like thermistor sintered body. The electrodes 12A and 12B are formed from platinum (Pt) or another noble metal.

The electrodes 12A and 12B are formed as thick films or thin films. The thick film electrodes 12A and 12B are formed by applying a paste which has been prepared by mixing an organic binder with platinum powder, to both the front and rear surfaces of the thermistor sintered body, and by drying and then sintering the paste. On the other hand, the thin film electrode can be formed by vacuum deposition or sputtering.

The thermistor sintered body on which the electrodes 12A and 12B have been formed is worked into a predetermined dimension.

The connection electrodes 13A and 13B are formed of metal films which are formed on the surfaces of the electrodes 12A and 12B, respectively. Also the connection electrodes 13A and 13B are formed from platinum (Pt) or another noble metal.

One ends of the lead wires 14A and 14B are electrically and mechanically connected to the electrodes 12A and 12B via the connection electrodes 13A and 13B, respectively. The other ends of the lead wires 14A and 14B are connected to an external detection circuit. The lead wires 14A and 14B are formed of a wire material which has heat resistance and is formed from, for example, platinum or an alloy of platinum and iridium (Ir).

The lead wires 14A and 14B are connected to the electrodes 12A and 12B in the following way.

A paste containing a platinum powder which will form the connection electrodes 13A and 13B is applied to one end sides of the lead wires 14A and 14B beforehand. The platinum paste is dried in a state in which sides of the lead wires 14A and 14B, to which the platinum paste has been applied, are in contact with the electrodes 12A and 12B, respectively, and then the platinum powder is sintered.

For the covering layer 15 shown in FIG. 7A, the glass can be used which contains, for example, $SiO_2$, CaO, SrO, BaO, $Al_2O_3$ and $SnO_2$ as the raw materials. By such glass, the thermistor element 11 and the one end sides of the lead wires 14A and 14B are sealed.

A method for sealing the thermistor sintered body and the like by the covering layer 15 can be arbitrarily selected; and it is possible to seal the thermistor sintered body and the like by covering the thermistor sintered body and the like with, for example, a glass tube which is made from glass and becomes the covering layer 15, and then by melting the glass tube.

The thermistor 10 is preferably subjected to annealing treatment, after having been sealed by glass and cooled. By this annealing treatment, it becomes possible to prevent the resistance of the thermistor element 11 from decreasing.

Next, another form of the thermistor 20 will be described with reference to FIG. 8A and FIG. 8B.

Figure 8A:
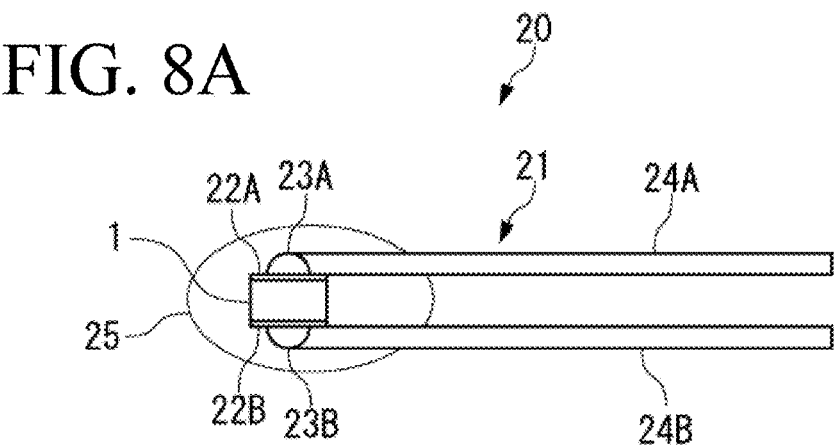
FIG. 8A is a perspective view showing another example of the thermistor element that uses the thermistor sintered body according to the present embodiment.

The thermistor 20 includes a thermistor element 21 and a covering layer 25 as shown in FIG. 8A, and is similar to the thermistor 10 in appearance. The thermistor element 21 and the covering layer 25 have similar functions to those of the thermistor element 11 and the covering layer 15 of the thermistor 10, respectively.

As shown in FIG. 8A, the thermistor element 21 in this example includes a flat plate-like thermistor sintered body, electrodes 22A and 22B, connection electrodes 23A and 23B, and lead wires 24A and 24B.

The thermistor element 21 has features in portions of the thermistor sintered body and the electrodes 22A and 22B, as compared with the thermistor element 11. As shown in a middle stage of FIG. 8B, the thermistor sintered body and the electrodes 22A and 22B constitute a thermistor chip 33, in the thermistor element 21. The thermistor chip 33 is produced in the following way.

Into the previously described pulverized calcined powder, for example, an ethyl cellulose-based binder is mixed, and the mixture is formed into a sheet shape. The conditions of the calcination are as previously described.

Next, a predetermined dimension of the sheet is punched from the formed sheet, and is sintered. The conditions of the sintering are as previously described. Then, a wafer obtained by the sintering is polished and a wafer 31 having a predetermined thickness is obtained as is shown in the middle stage of FIG. 8B. After that, a paste for forming an electrode is applied to both the front and rear surfaces of the polished wafer 31 (thermistor sintered body) by printing, and then is sintered; and a wafer 30 is obtained on which electrode films have been formed. The electro-conductive material to be contained in the paste is selected from platinum (Pt) and other noble metals. When the platinum has been selected, the sintering is performed at approximately 1300° C. After that, the wafer 30 is cut so as to have a predetermined dimension, as shown in the middle stage of FIG. 8B, and thereby the thermistor chip 33 is obtained which has the film-like electrodes 22A and 22B formed on the front and back surfaces, respectively.

Figure 8B:
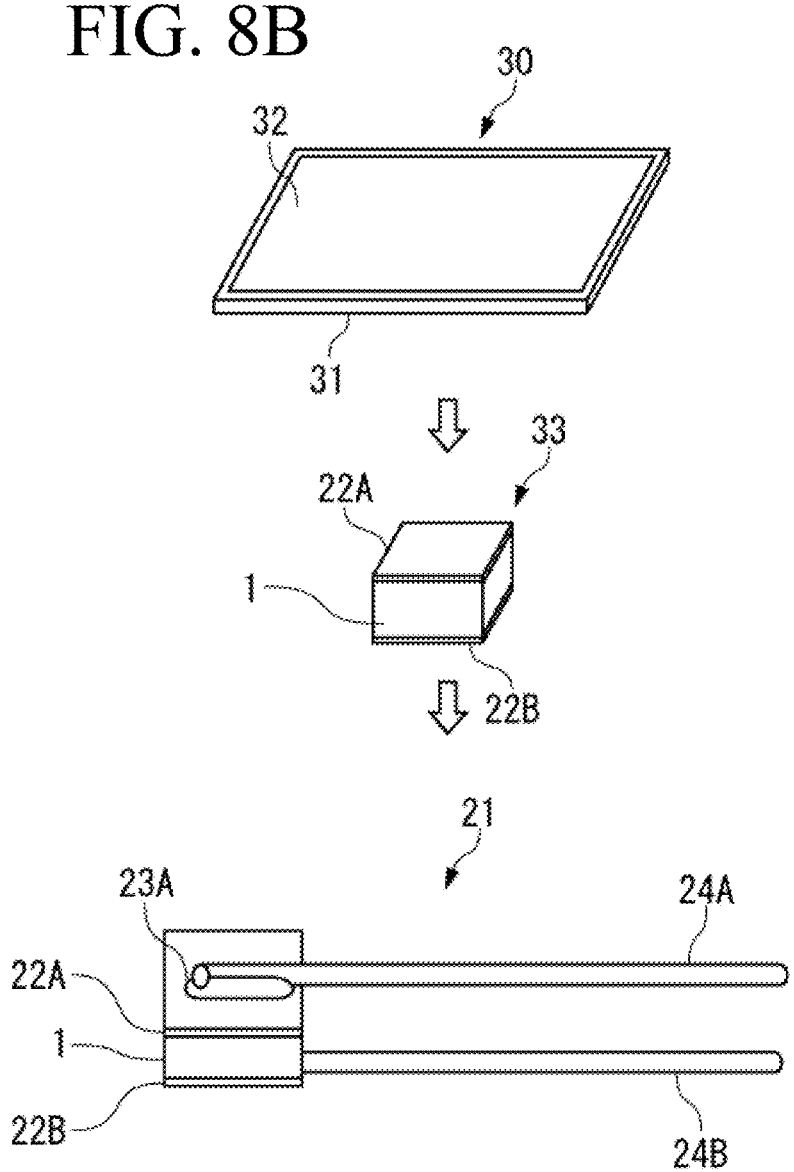
FIG. 8B is a view schematically showing a manufacturing procedure thereof.

Next, the lead wires 24A and 24B are joined to the electrodes 22A and 22B on both the front and rear surfaces of the thermistor sintered body, respectively, with the use of a Pt paste, then the resultant thermistor sintered body is subjected to baking treatment to have the connection electrodes 23A and 23B formed thereon, and the thermistor element 21 shown in the lower part of FIG. 8B is produced.

Next, the covering layer 25 is formed; and for the covering layer 25, the previously described glass can be used, or the covering material can also be used which is formed of a constituent material similar to the thermistor sintered body.

For this covering material, a composite oxide can be used that has been obtained by sintering a powder which has been obtained by calcining $Y_2O_3$, $Cr_2O_3$ and $Mn_3O_4$ disclosed in Patent Literature 2 and a $B_2O_3$ powder. In other words, the covering layer of the thermistor sintered body in the present invention can be arbitrarily selected as long as the purpose can be achieved.

Example 1

Next, a thermistor sintered body of the present invention will be described based on Example 1. Example 1 corresponds to the previously described form A1.

Raw material powders having the following average particle sizes were prepared, and thermistor sintered bodies having various compositions shown in FIG. 3 were produced according to the above described production steps. In this table, Nos. 1 to 35 are samples in which Cr/Mn is smaller than 1 and Mn is rich relative to Cr; and Nos. 36 and 37 are samples in which Cr/Mn is 1 or larger, in other words, Cr and Mn are in equal amounts, or Cr is rich. Calcination was performed under conditions of 1000° C. and 24 hours, and sintering was performed under conditions of 1500° C. and 24 hours, both in the air.

$Y_2O_3$ powder: 0.1 μm $Cr_2O_3$ powder: 2.0 μm
$Mn_3O_4$ powder: 5.0 μm $CaCO_3$ powder: 2.0 μm The B constant was determined for each of the obtained sintered bodies. The results are collectively shown in FIG. 3. Incidentally, the B constants in FIG. 3 are values between 25° C. and 50° C. (B25/50).

As is shown in FIG. 3, it is understood that the B constants (B25/50) of thermistor sintered bodies (Samples Nos. 1 to 35) in which Mn is rich relative to Cr become low, as compared to thermistor sintered bodies (Samples Nos. 36 and 37) in which Cr/Mn is 1 or larger.

Referring to the relationship between Cr/Mn and the B constant, as shown in the Sample No. 1, for example, when Mn is too excessive with respect to Cr, the B constant B25/50 becomes high. Therefore, in order to lower the B constant (B25/50), it is preferable for Cr/Mn to be controlled in the range of 0.4 to 0.9, and is more preferable to be controlled in the range of 0.6 to 0.8.

Ca contents are different between Samples Nos. 1 to 6 and Samples Nos. 7 to 12, and are 3.5 mol % and 4 mol %, respectively; and the B constants of Samples Nos. 7 to 12, of which the Ca contents are high, can be lowered, as compared to those of Samples Nos. 1 to 6.

The same can be inferred from the comparison between Samples Nos. 1 to 6 and Samples Nos. 13 to 17.

Next, the B constants in a plurality of temperature ranges were determined by a procedure of measuring resistance values in the range of −40° C. to 1050° C., about several samples in FIG. 3. The B constants were determined about the following four types of which the Rn and Rm were different in the following expression. Incidentally, the B constants were similarly determined for Sample Nos. 36 and 37, which corresponded to Comparative Example.

$B(m/n)=(\ln Rm-\ln Rn)/(1/Tm-1/Tn)$

Rm: resistance value at Tm° C.
Rn: resistance value at Tn° C.
B(0/1000): R0; resistance value at 0° C.
R1000; resistance value at 1000° C.
B(−40/25): R-40; resistance value at −40° C.
R25; resistance value at 25° C.
B(25/600): R25; resistance value at 25° C.
R600; resistance value at 600° C.
B(600/1000): R600; resistance value at 600° C.
R1000; resistance value at 1000° C.
The results are shown in FIG. 4.

It is understood that B(0/1000) of the Samples Nos. 3, 9, 10, 11, 13 and 19 which correspond to the present invention are 2400 K or lower, and the B constants are controlled to be lower in a wide temperature range of −40° C. to 1000° C. than those of Samples Nos. 36 and 37, which correspond to Comparative Example.

B(−40/25), B(25/600) and B(600/1000) are the B constants which were determined by dividing the range of −40° C. to 1000° C. into a low temperature range (−40° C. to 25° C.), a middle temperature range (25° C. to 600° C.) and a high temperature range (600° C. to 1000° C.)

It is understood that the B constants of Samples Nos. 3, 9, 10, 11, 13 and 19 which correspond to the present invention are controlled to be lower than those of Samples Nos. 36 and 37, which correspond to Comparative Example, in any temperature range of the low temperature range, the middle temperature range and the high temperature range.

In FIG. 4, the resistance values at 1050° C. (1000° C., in case of Comparative Example) are shown, and according to the thermistor sintered body according to the present invention, the resistance value at 1050° C. can be increased to 0.05 kΩ or larger, and further 0.1 kΩ or larger. In Sample No. 10 of which the resistance value at 1050° C. is 0.1 kΩ or larger, the resistance value does not fall below 0.05 kΩ even at 1200° C.; and Sample No. 10 can achieve accurate temperature detection at 1200° C.

In addition, in FIG. 4, a temperature at which a resistance value of 100 kΩ is exhibited is also shown, but the thermistor sintered body in the present invention can exhibit a resistance value of 100 kΩ at a temperature equal to or lower than room temperature such as −30° C. and even −40° C.

As described above, it is possible to achieve the accurate temperature detection in a wide temperature range from −50 to 1200° C., by using the thermistor sintered body of the present invention.

Figure 5A:
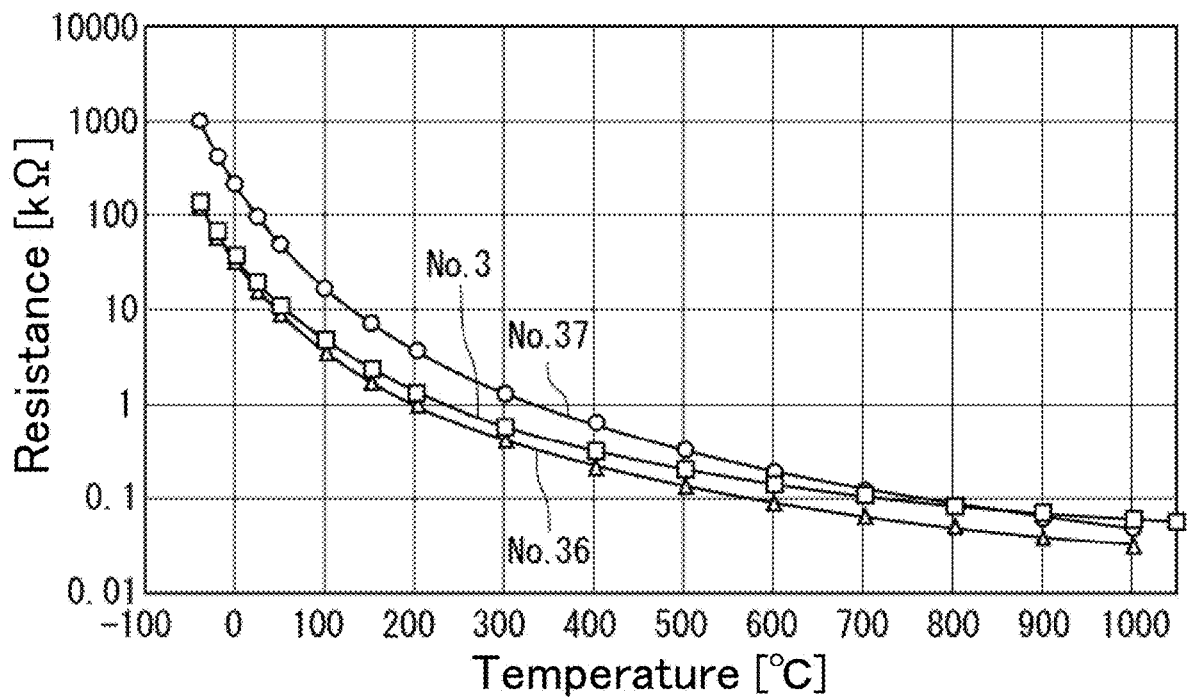
FIG. 5A shows R-T curves of Example (Sample No. 3) and Comparative Examples (Sample No. 36 and Sample No. 37)
Figure 5B:
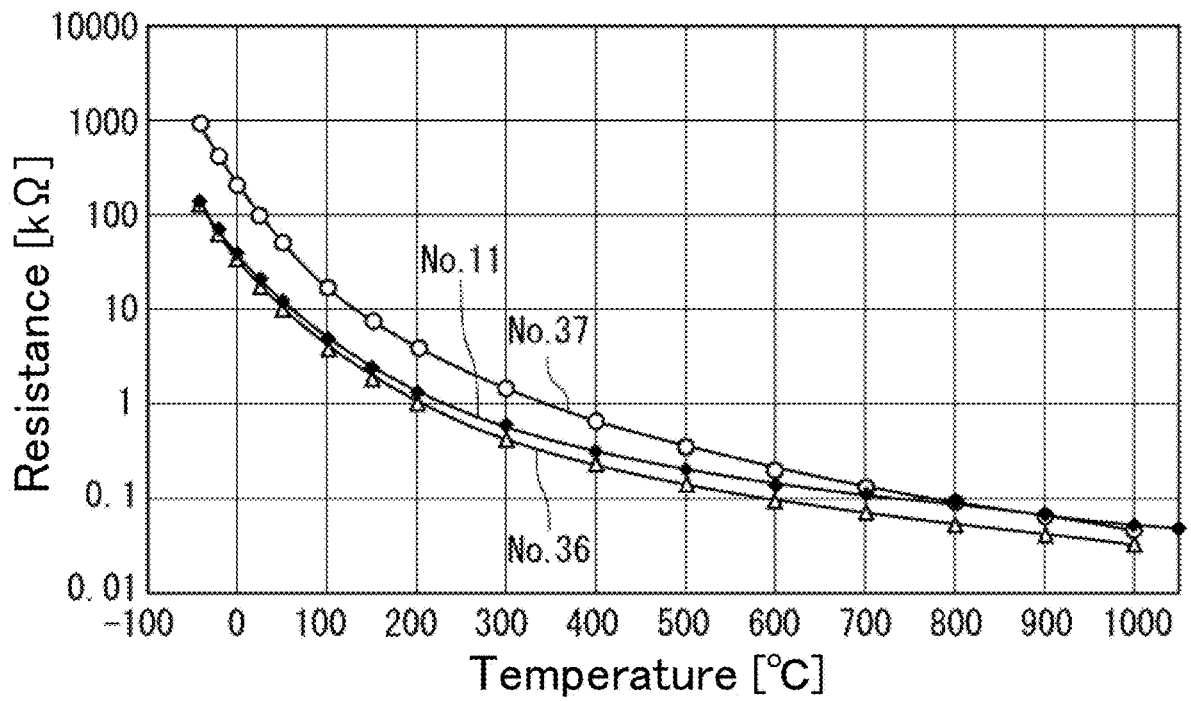
FIG. 5B shows R-T curves of Example (Sample No. 11) and Comparative Examples (Sample No. 36 and Sample No. 37).

The graphs of FIG. 5A and FIG. 5B show a relationship between a temperature and a resistance value (R-T curve) of Samples Nos. 3, 11, 36 and 37 in the range of −40° C. to 1050° C. However, the temperatures of Sample Nos. 36 and 37 are 1000° C. or lower. The above description is similar also in FIG. 6A and FIG. 6B which will be described later.

In Sample No. 3 and Sample No. 11 which correspond to the present invention, the R-T curve is positioned in a middle of the R-T curves of Sample No. 36 and Sample No. 37. In addition, Sample No. 3 and Sample No. 11 show a resistance value equivalent to Sample No. 36 which is directed to a low temperature to a medium temperature, at a low temperature of −40° C., and show a resistance value equivalent to Sample No. 37 which is directed to a medium temperature to a high temperature, at a high temperature of 1050° C. In other words, Sample No. 3 and Sample No. 11 enable the accurate temperature detection in a wide temperature range from the low temperature to the high temperature.

Figure 6A:
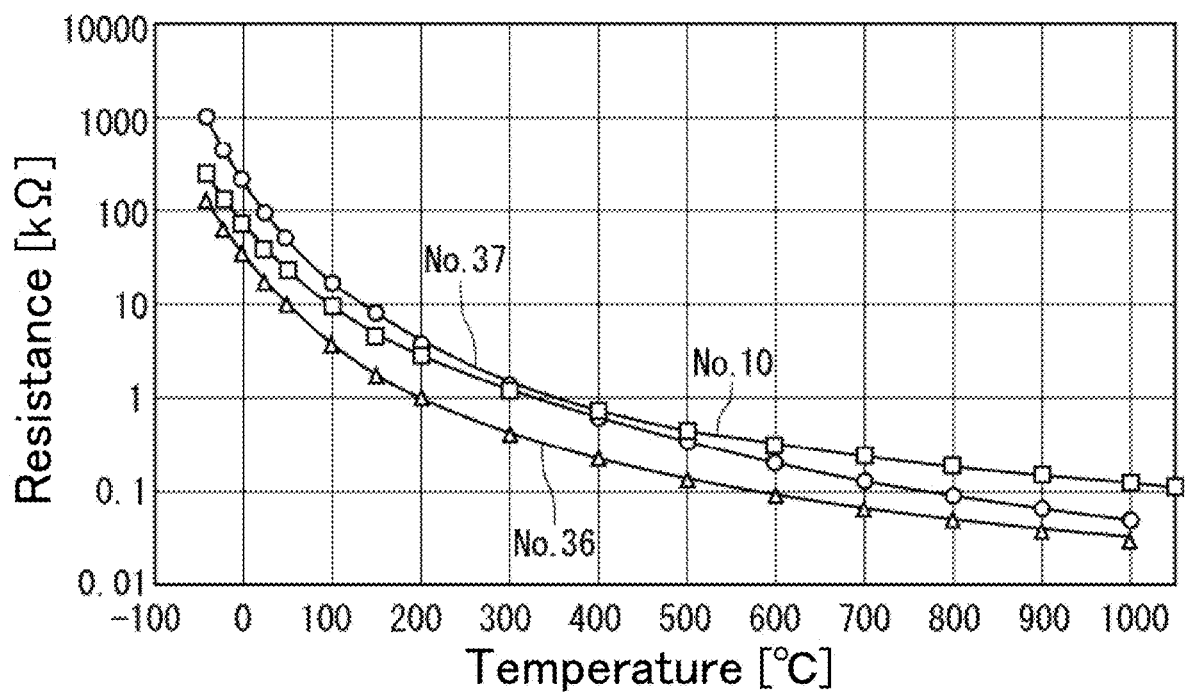
FIG. 6A shows R-T curves of Example (Sample No. 10) and Comparative Examples (Sample No. 36 and Sample No. 37)
Figure 6B:
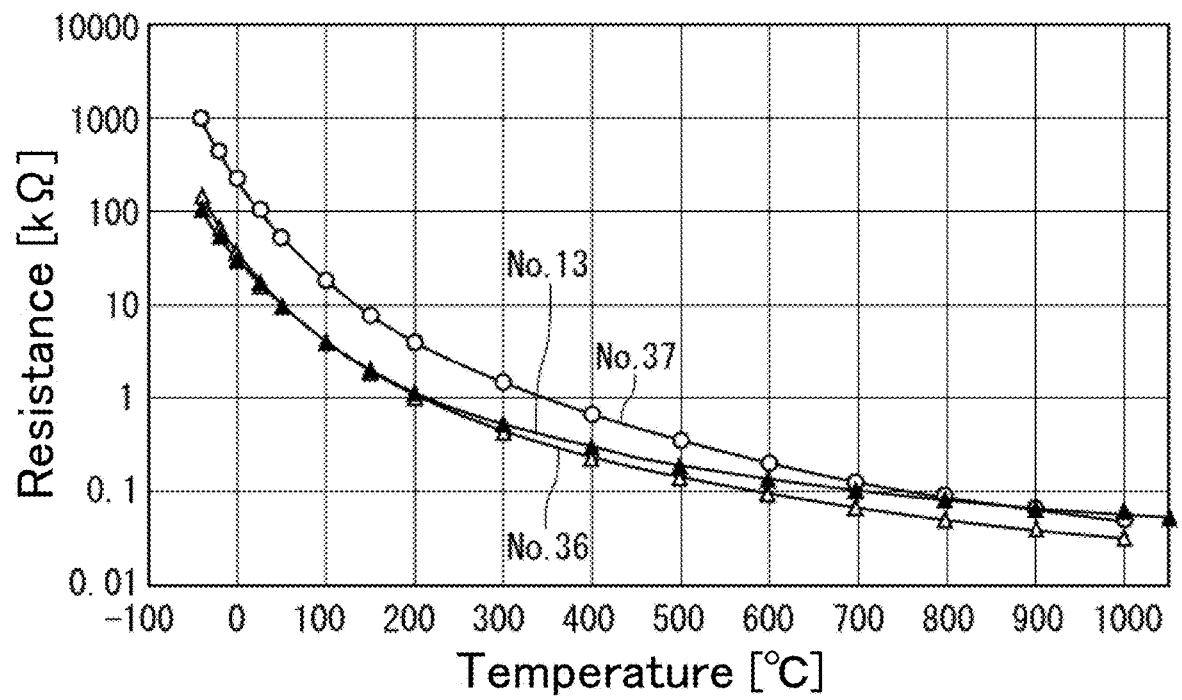
FIG. 6B shows R-T curves of Example (Sample No. 13) and Comparative Examples (Sample No. 36 and Sample No. 37).

Next, the graphs of FIG. 6A to FIG. 6B show R-T curves in the range of −40° C. to 1050° C. of Samples Nos. 10, 13, 36 and 37.

Sample No. 10 has a high resistance value in a range from a medium temperature to a high temperature, enables the temperature detection in a wide temperature range from a low temperature to a high temperature, and is suitable for accurately detecting a temperature particularly in the high temperature range.

Example 2

Next, a thermistor sintered body of the present invention will be described based on Example 2. Example 2 corresponds to the previously described form A2 and form B.

Example 2 is further richer in Mn relative to Cr than Example 1, and includes even a thermistor sintered body (form B) which does not contain Cr.

Thermistor sintered bodies having chemical compositions shown in FIG. 9 were produced by a similar method to that in Example 1. Samples Nos. 38 to 41 in FIG. 9, in which Cr/Mn is 0.25, is richer in Mn than Sample No. 7 in which Mn is richest in Example 1 and Cr/Mn is 0.462. Furthermore, Samples Nos. 42 to 44 in FIG. 9 do not contain Cr, and can be referred to as examples in which Mn is richest relative to Cr. In addition, Samples Nos. 38 to 44 contain Ca in the range of 8 to 16 mol %, and contain more Ca than Sample No. 19 and the like that contain 4.5 mol % of Ca, which is highest in Example 1.

For the thermistor sintered bodies of Samples Nos. 38 to 44, the B constant was measured in a similar way to that in Example 1. The results are shown in FIG. 9. As for Sample Nos. 42 to 44, the B constants equivalent to those in Example 1 were obtained, and as for Samples Nos. 38 to 41, the B constants which surpassed those in Example 1 were obtained. The measurement results are out of the cognizance of the person skilled in the art, as will be described below.

Conventionally, in regard to Cr/Mn and the B constant and in regard to the Ca content and the B constant, a thermistor sintered body which includes the $Y_2O_3$ phase and the $Y(Cr, Mn)O_3$ phase and contains Ca has been recognized in the following way.

[Cr/Mn and B Constant]

A low B constant can be obtained in a sintered body that includes the $Y_2O_3$ phase and the $Y(Cr, Mn)O_3$ phase, in a range in which Cr/Mn is in the vicinity of 1. When Mn exceeds this range and becomes rich, the B constant becomes high.

[Ca Content and B Constant]

A low B constant can be obtained in the sintered body which includes the $Y_2O_3$ phase and the $Y(Cr, Mn)O_3$ phase, in a range in which the content of Ca is in the vicinity of 5 mol %. When the sintered body contains Ca beyond this range, the B constant becomes high.

According to the above described conventional recognition, the B constants of Sample Nos. 38 to 44 are high in which Mn is rich relative to Cr and Ca exceeds 5 mol %. However, as shown in FIG. 9, the B constants of Samples Nos. 38 to 44 are low. This is understood to be because crystal structures of these samples are concerned.

It has been considered that when the thermistor sintered body which includes the $Y_2O_3$ phase and the $Y(Cr, Mn)O_3$ phase has the crystal structure of an orthorhombic crystal system, the thermistor sintered body exhibits stable characteristics (B constant) until reaching a high temperature. On the other hand, $YMnO_3$ which does not contain Cr has a crystal structure of a hexagonal crystal system, and accordingly shows a high B constant. In addition, when $YMnO_3$ becomes the $Y(Cr, Mn)O_3$ phase by containing Cr, the crystal structure becomes the orthorhombic crystal system.

However, according to the study of the present inventors, even though Mn is rich relative to Cr, the crystal structure of the orthorhombic crystal system can be obtained by containing Ca in an amount exceeding conventional recognition, and the B constant can be lowered.

Figure 10:
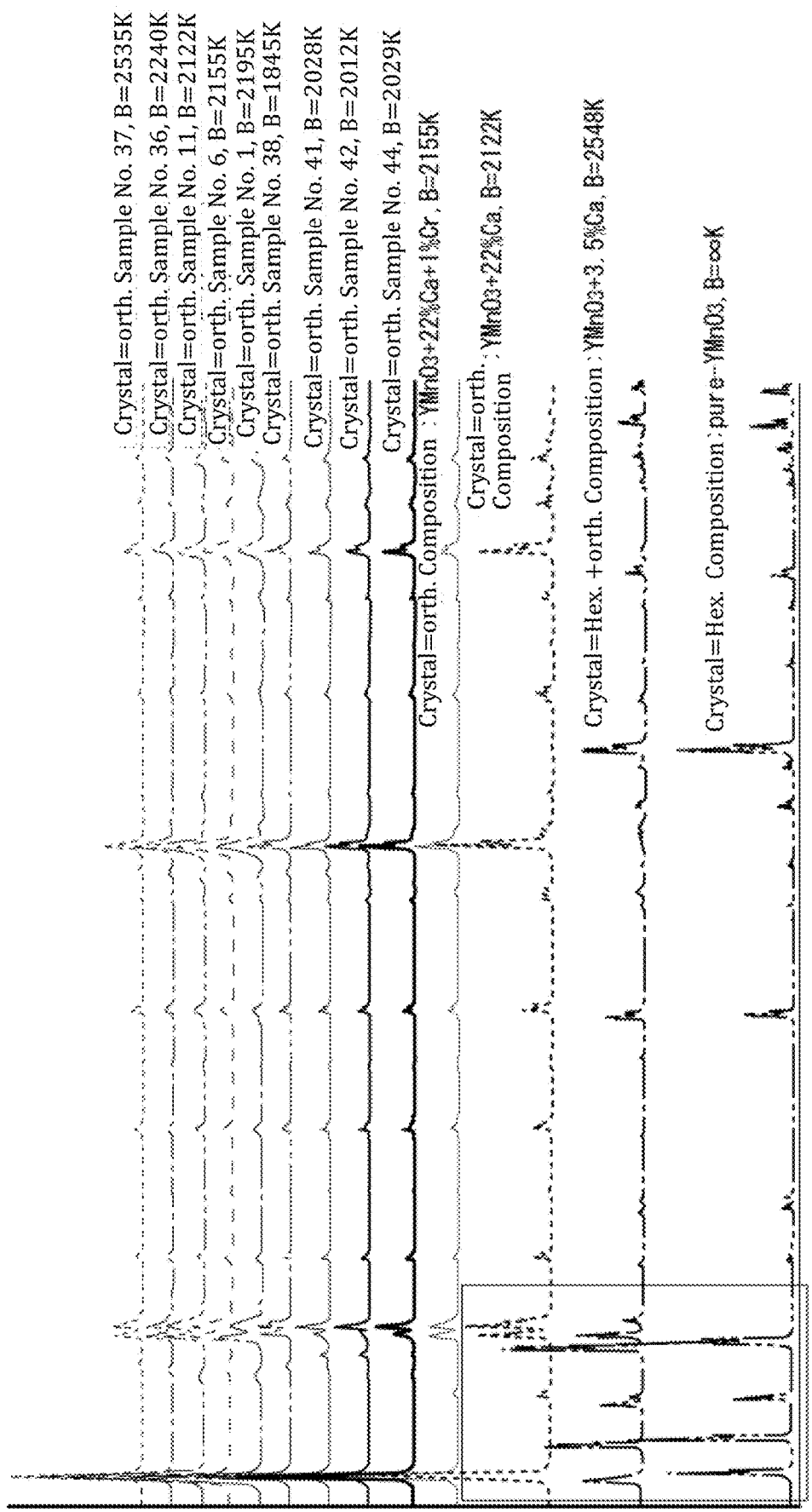
FIG. 10 is a graph showing results obtained by having identified crystal structures of thermistor sintered bodies of Example 1 and Example 2 and thermistor sintered bodies of Comparative Example, by X-ray diffraction.
Figure 11:
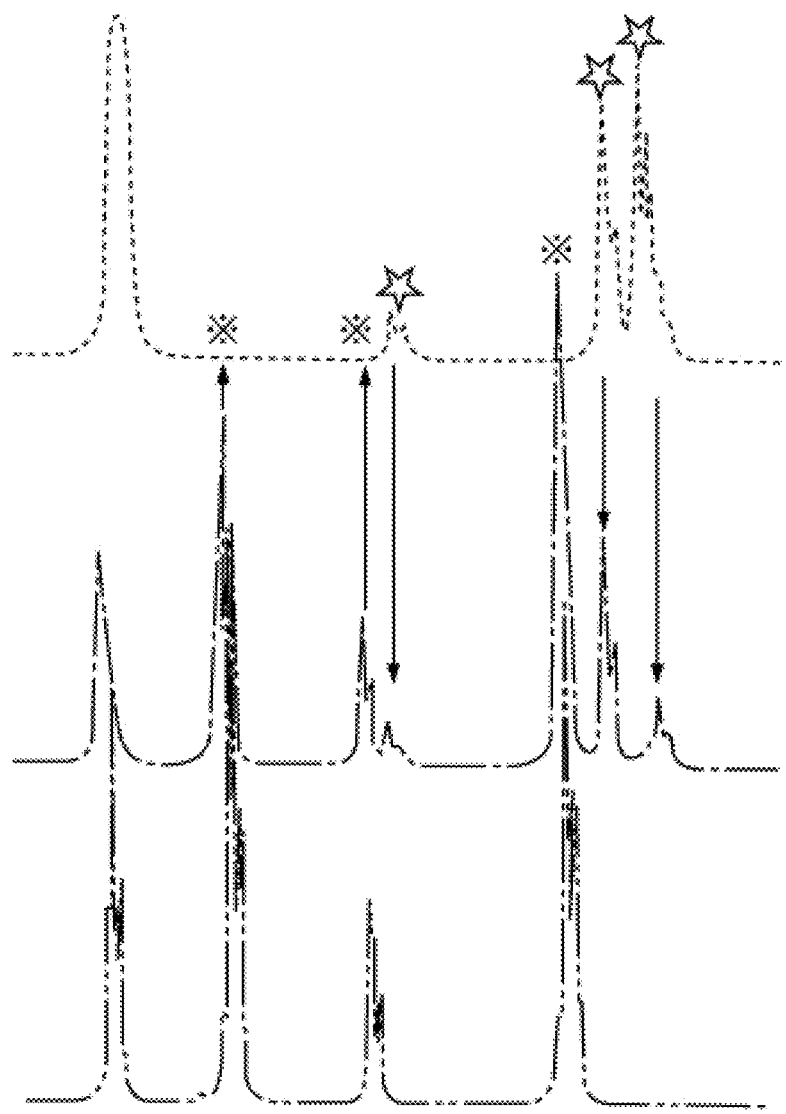
FIG. 11 is a partially enlarged view of the graph of FIG. 10, and is a diagram for describing a change of the crystal structure.

Specifically, as is shown in FIG. 10, the crystal structures of Samples Nos. 38, 41, 42 and 44 in Example 2 are the orthorhombic crystal system as are those of Samples Nos. 1, 6 and the like in Example 1.

In FIG. 10, the bottom is a chart of a sintered body which is formed of a composite phase of the $Y_2O_3$ phase and the $YMnO_3$ phase and does not contain Ca, and the second from the bottom is a chart of a sintered body which is formed of the composite phase of the $Y_2O_3$ phase and the $YMnO_3$ phase and contains 3.5 mol % of Ca. Furthermore, the third from the bottom is a chart of a sintered body which is formed of the composite phase of the $Y_2O_3$ phase and the $YMnO_3$ phase and contains 22 mol % of Ca.

An enlarged view of a portion in which these three charts are surrounded by a rectangle in FIG. 10 is shown in FIG.

11. A single-phase sintered body of the YMnO$_3$, which does not contain Ca, has a crystal structure of only a hexagonal crystal system.

In a sintered body which further contains 3.5 mol % of Ca in the above sintered body, a peak of the crystal structure of the orthorhombic crystal system is detected, but a peak of the crystal structure of the hexagonal crystal system is detected; and the sintered body has a crystal structure in which the orthorhombic crystal system and the hexagonal crystal system are mixed.

In a sintered body in which the content of Ca has increased to 22 mol %, a peak of the crystal structure of the hexagonal crystal system disappears; and the sintered body is formed of a crystal structure of only the orthorhombic crystal system.

The results are as described above, and the single-phase sintered body of the YMnO$_3$ has the crystal structure of the hexagonal crystal system. However, the crystal structure of the orthorhombic crystal system can be obtained by containing a considerable amount of, here 22 mol % of Ca, even though the sintered body is the single-phase sintered body of the YMnO$_3$. The reason why the B constant of Example 2 (Sample Nos. 38 to 44) is low is attributed to that the crystal structure is the orthorhombic crystal system.

As has been described in the above Example 1 and Example 2, the thermistor sintered body having a composite structure which includes the Y$_2$O$_3$ phase and the Y(Cr, Mn)O$_3$ phase, or the Y$_2$O$_3$ phase and the YMnO$_3$ phase can control the B constant to be low and can control the lowering of the resistance value particularly in a high temperature range, by controlling Mn to be rich relative to Cr. Accordingly, according to the present invention, the accurate temperature detection can be achieved in a wide temperature range.

The present invention has been described above based on the preferred embodiments and Examples, but the configurations included in the above described embodiments can be selected, or be appropriately changed to other configurations, insofar as they do not deviate from the scope of the invention.

The thermistor sintered body and the thermistor of the present invention can be used over a wide temperature range from −50° C. to approximately 1200° C., and accordingly can be widely used as a temperature sensor for automotive exhaust-gas treatment devices, and for the measurement of a high temperature in a water heater, a boiler, an oven range, a stove and the like.

In addition, it is preferable that the thermistor sintered body of the present invention is formed of only a crystal structure of the orthorhombic crystal system, but it is not excluded that a crystal structure of the hexagonal crystal system exists. As long as the characteristics of the present invention can be obtained, even when a trace amount of the crystal structure of the hexagonal crystal system is included in the crystal structure of the orthorhombic crystal system, the thermistor sintered body corresponds to the thermistor sintered body of the present invention.

REFERENCE SIGNS LIST

2 Y$_2$O$_3$ phase
3 Y(Cr, Mn)O$_3$ phase
10 and 20 Thermistor
11 and 21 Thermistor element
12A, 12B, 22A and 22B Electrode
13A, 13B, 23A and 23B Connection electrode
14A, 14B, 24A and 24B Lead wire
15 and 25 Covering layer
31 Wafer
33 Thermistor chip

The invention claimed is:

1. A thermistor sintered body comprising a sintered body that comprises a Y$_2$O$_3$ phase and a Y(Cr, Mn)O$_3$ phase or a YMnO$_3$ phase, and is rich in Mn relative to Cr, wherein
   a B constant (B(0/1000)) determined by the following expression is 2400 K or lower;
   B=(lnRm−lnRn)/(1/Tm−1/Tn), wherein
   Rm: resistance value at 0° C.,
   Rn: resistance value at 1000° C.,
   Tm: 0° C., and
   Tn: 1000° C.

2. The thermistor sintered body according to claim 1, wherein
   the sintered body comprises the Y$_2$O$_3$ phase and the Y(Cr, Mn)O$_3$ phase; and
   a chemical composition of Cr, Mn, Ca and Y excluding oxygen is Cr: 3 to 9 mol %, Mn: 5 to 15 mol %, Ca: 1 to 8 mol % (wherein Cr/Mn<1.0), and the balance being unavoidable impurities and Y, wherein
   Cr/Mn is 0.4 to 0.9.

3. A thermistor element comprising:
   a heat sensitive body;
   a pair of lead wires electrically connected to the heat sensitive body; and
   a covering layer covering the heat sensitive body, wherein the heat sensitive body comprises the thermistor sintered body according to claim 2.

4. The thermistor sintered body according to claim 1, wherein
   Ca dissolves in the Y(Cr, Mn)O$_3$ phase or in the YMnO$_3$ phase.

5. A thermistor element comprising:
   a heat sensitive body;
   a pair of lead wires electrically connected to the heat sensitive body; and
   a covering layer covering the heat sensitive body, wherein the heat sensitive body comprises the thermistor sintered body according to claim 4.

6. The thermistor sintered body according to claim 1, comprising a crystal structure of an orthorhombic crystal system.

7. A thermistor element comprising:
   a heat sensitive body;
   a pair of lead wires electrically connected to the heat sensitive body; and
   a covering layer covering the heat sensitive body, wherein the heat sensitive body comprises the thermistor sintered body according to claim 6.

8. The thermistor sintered body according to claim 1, wherein
   a B constant (B(−40/25)) determined by the following expression is 2200 K or lower;
   B=(lnRm−lnRn)/(1/Tm−1/Tn), wherein
   Rm: resistance value at −40° C.,
   Rn: resistance value at 25° C.,
   Tm: −40° C., and
   Tn: 25° C.

9. A thermistor element comprising:
   a heat sensitive body;
   a pair of lead wires electrically connected to the heat sensitive body; and
   a covering layer covering the heat sensitive body, wherein the heat sensitive body comprises the thermistor sintered body according to claim 8.

10. The thermistor sintered body according to claim 1, wherein
a B constant (B(25/600)) determined by the following expression is 2300 K or lower;
B=(lnRm−lnRn)/(1/Tm−1/Tn), wherein
Rm: resistance value at 25° C.,
Rn: resistance value at 600° C.,
Tm: 25° C., and
Tn: 600° C.

11. The thermistor sintered body according to claim 1, wherein
a B constant (B(600/1000)) determined by the following expression is 2800 K or lower;
B=(lnRm−lnRn)/(1/Tm−1/Tn), wherein
Rm: resistance value at 600° C.,
Rn: resistance value at 1000° C.,
Tm: 600° C., and
Tn: 1000° C.

12. The thermistor sintered body according to claim 1, wherein
a resistance value at 1050° C. is 0.05 kΩ or larger.

13. A thermistor element comprising:
a heat sensitive body;
a pair of lead wires electrically connected to the heat sensitive body; and
a covering layer covering the heat sensitive body, wherein the heat sensitive body comprises the thermistor sintered body according to claim 12.

14. The thermistor sintered body according to claim 1, wherein
a resistance value of 100 kΩ is exhibited at room temperature or lower.

15. A thermistor element comprising:
a heat sensitive body;
a pair of lead wires electrically connected to the heat sensitive body; and
a covering layer covering the heat sensitive body, wherein the heat sensitive body comprises the thermistor sintered body according to claim 14.

16. A thermistor element comprising:
a heat sensitive body;
a pair of lead wires electrically connected to the heat sensitive body; and
a covering layer covering the heat sensitive body, wherein the heat sensitive body comprises the thermistor sintered body according to claim 1.

17. A thermistor sintered body comprising a sintered body that comprises a $Y_2O_3$ phase and a $Y(Cr, Mn)O_3$ phase, and is rich in Mn relative to Cr, wherein
a B constant (B(0/1000)) determined by the following expression is 2400 K or lower;
B=(lnRm−lnRn)/(1/Tm−1/Tn), wherein
Rm: resistance value at 0° C.,
Rn: resistance value at 1000° C.,
Tm: 0° C., and
Tn: 1000° C., wherein
a chemical composition of Cr, Mn, Ca and Y excluding oxygen is Cr: ≤mol % (excluding 0), Mn: 12 to 23 mol %, Ca: 6 to 18 mol %, and the balance being unavoidable impurities and Y, and wherein
Cr/Mn is 0.5 or smaller (excluding 0).

18. A thermistor element comprising:
a heat sensitive body;
a pair of lead wires electrically connected to the heat sensitive body; and
a covering layer covering the heat sensitive body, wherein the heat sensitive body comprises the thermistor sintered body according to claim 17.

19. A thermistor sintered body comprising a sintered body that comprises a $Y_2O_3$ phase and a $YMnO_3$ phase, and is rich in Mn relative to Cr, wherein
a B constant (B(0/1000)) determined by the following expression is 2400 K or lower;
B=(lnRm−lnRn)/(1/Tm−1/Tn), wherein
Rm: resistance value at 0° C.,
Rn: resistance value at 1000° C.,
Tm: 0° C., and
Tn: 1000° C., and wherein
a chemical composition of Mn, Ca and Y excluding oxygen is Mn: 12 to 18 mol %, Ca: 6 to 18 mol %, and the balance being unavoidable impurities and Y.

20. A thermistor element comprising:
a heat sensitive body;
a pair of lead wires electrically connected to the heat sensitive body; and
a covering layer covering the heat sensitive body, wherein the heat sensitive body comprises the thermistor sintered body according to claim 19.

* * * * *

UNITED STATES PATENT AND TRADEMARK OFFICE
CERTIFICATE OF CORRECTION

PATENT NO. : 10,643,768 B2  
APPLICATION NO. : 16/475944  
DATED : May 5, 2020  
INVENTOR(S) : Akitaka Takeuchi and Naohiro Niizeki Page 1 of 1

It is certified that error appears in the above-identified patent and that said Letters Patent is hereby corrected as shown below:

In the Claims

Claim 17, Column 16, Line 15, "Cr: $\leq$mol% (excluding 0)," should read --Cr: $\leq 5$ mol% (excluding 0),--

Signed and Sealed this  
Twenty-sixth Day of October, 2021

Drew Hirshfeld  
*Performing the Functions and Duties of the*  
*Under Secretary of Commerce for Intellectual Property and*  
*Director of the United States Patent and Trademark Office*